United States Patent [19]  [11] 4,352,610
Yankovoy et al.  [45] Oct. 5, 1982

[54] METHOD AND TOOL FOR GENERATING HOLES IN COMPOSITE MATERIALS

[75] Inventors: Alexander Yankovoy; Theodore Ozer, both of Wallingford, Pa.

[73] Assignee: The Boeing Company, Seattle, Wash.

[21] Appl. No.: 192,572

[22] Filed: Sep. 30, 1980

Related U.S. Application Data

[63] Continuation-in-part of Ser. No. 166,868, Jul. 7, 1980.

[51] Int. Cl.³ .............................................. B23B 51/04
[52] U.S. Cl. .................................... 408/1 R; 408/206; 408/207; 408/209
[58] Field of Search ................ 408/1, 191, 192, 203.5, 408/204, 205, 206, 209, 212, 213, 228, 193, 194, 211

[56] References Cited

U.S. PATENT DOCUMENTS

| 2,188,631 | 1/1940 | Kraus | 408/206 |
| 2,435,648 | 2/1948 | Frevel | 408/206 |
| 2,822,008 | 2/1958 | Schaefer | 408/191 |
| 3,648,508 | 3/1972 | Hougen | 408/204 |

FOREIGN PATENT DOCUMENTS

| 2404029 | 8/1975 | Fed. Rep. of Germany | 408/1 |
| 2420204 | 3/1976 | Fed. Rep. of Germany | 408/204 |

Primary Examiner—Leonidas Vlachos
Attorney, Agent, or Firm—Jones, Tullar & Cooper

[57] ABSTRACT

A method and tool for trepanning holes in a composite of materials having different strength and elastic characteristics. The method provides for simultaneous point and surface cutting which occurs at the inner and outer circumferential surfaces of an annular hold being formed. The trepanning tool includes a cylindrical side wall with portions removed at one end to form a plurality of cutting elements or teeth. Each tooth includes a cutting single end point and associated cutting edges, there being inwardly and outwardly directed teeth.

16 Claims, 9 Drawing Figures

U.S. Patent  Oct. 5, 1982  Sheet 1 of 2  4,352,610
FIG.1
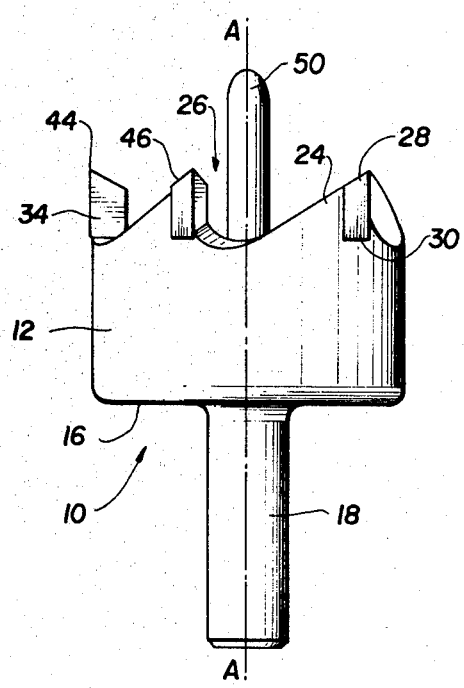
FIG.2
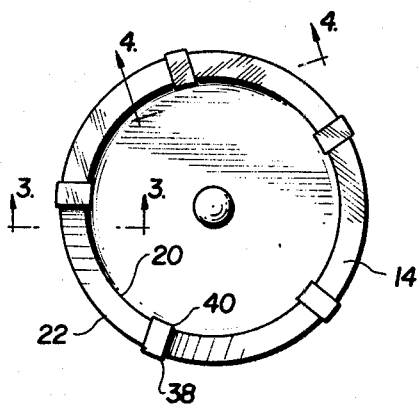
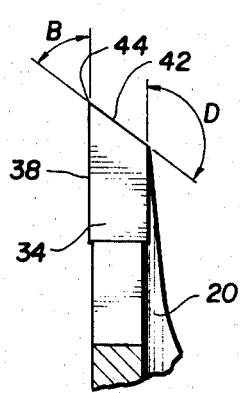
FIG.3
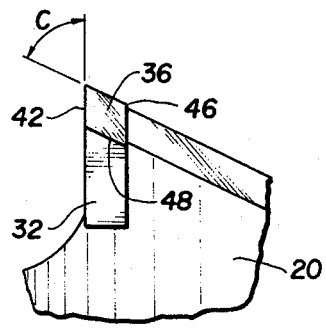
FIG.4

FIG.5
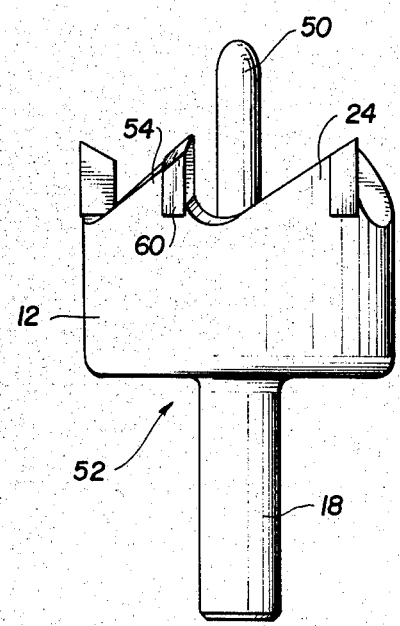
FIG.6
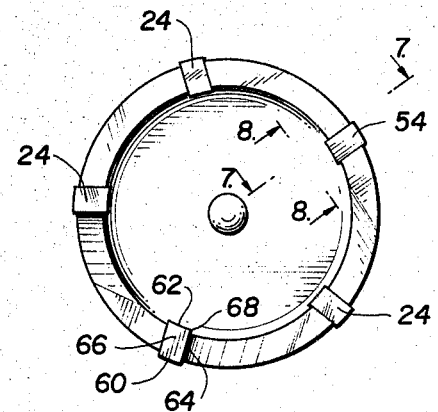
FIG.8
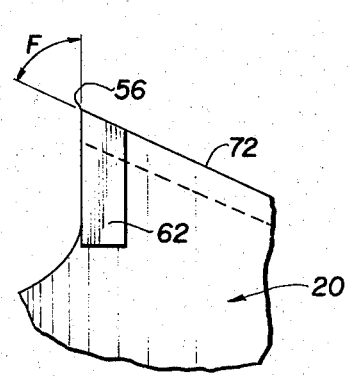
FIG.7
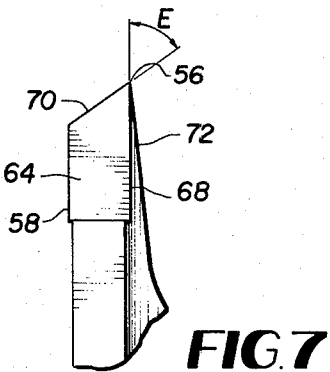
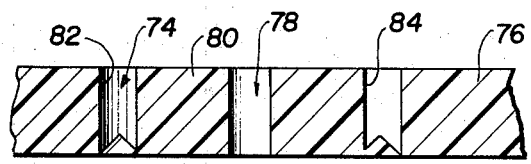
FIG.9

METHOD AND TOOL FOR GENERATING HOLES IN COMPOSITE MATERIALS

BACKGROUND OF THE INVENTION

This invention is a continuation-in-part of U.S. patent application, Ser. No. 166,868, filed July 7, 1980.

The invention relates in general to generating holes in composites, and in particular, to generating holes in composites comprising at least two materials having different moduli of elasticity with a trepanning tool.

In the past, it has been difficult to quickly and accurately drill holes in composite material, such as, for example, aramid fiber/epoxy or other resin-bonded laminates. Experience has shown that the aramid fibers, which have a smaller diameter and a higher tensile strength, elasticity, and sheer resistance than the more conventional glass fibers used in similar composite compositions, tend to deflect and bend before being cut by the shearing action of the cutting edge of the drill. This action forces the fibers into the softer resilient resin matrix material, increasing radial compressive forces on the drill and the surrounding composite material. These compressive forces generate frictional heat which further softens the resin matrix, by allowing the rough aramid fiber to further escape the shearing action of conventional drills. The heat generated also limits the drill speed and feed pressure so that the material surrounding the drill hole is not damaged by excessive heat. Also, as a result of this characteristic of aramid fiber reinforced resin laminates, holes drilled by conventional means are often undersized holes with frayed, fuzzy edges, with mushrooming of the aramid fibers at the tool exit.

The above-referenced U.S. patent application Ser. No. 166,868 discloses an optimized method and tool for quickly and easily generating deep holes with clean hole edges in composites of materials with different moduli of elasticity.

The method provides for simultaneous point and surface cutting. Point and surface cutting occur at the outer circumferential surface of the hole and generally along a radius of the hole to be drilled. At the outer circumferential surface, the point cutting proceeds normal to the planar area of the hole, while the surface cutting proceeds circumferentially.

The tool, which is generally shaped as a cylindrical rod, has an axially extending flute and an end surface which is inclined to the tool axis. The intersection of the end surface with one side surface of the flute, the intersection of the end surface with the semi-cylindrical outer surface of the rod, and the intersection of the one end surface of the flute and semi-cylindrical outer surface of the rod define a cutting single end point and associated cutting edges. The end surface intersects the one side of the flute adjacent the end point at an acute angle to form a first cutting edge. The same side of the flute intersects the outer surface adjacent the end point to form the second cutting edge. The second cutting edge intersects the first cutting edge at an acute angle at the single end point. The end surface also intersects the semi-cylindrical outer surface to form a third edge which intersects the first and second cutting edges at the single end point at respective acute angles.

During a hole forming operation, the single end point first cuts the composite and thereafter penetrates successive transverse planes of the composite, i.e., transverse to the longitudinal axis of the hole to be generated, and the portions of the cutting edges immediately adjacent the single end point cleanly cuts the fibers of the composite of each successively cut transverse plane in the immediate region of penetration. Penetration is facilitated by the two cutting edges and the third edge adjacent the single end point. The first cutting edge also cuts away chips from the cylindrical composite portion to be removed to form the hole progressively inward. By penetrating the composite and severing the fibers in the immediate region of the penetration, very little deflection of these fibers occurs; thus, the radial compressive forces exerted on the tool by these fibers and the thrust requirements of the tool are reduced to a minimum, and an accurately sized, clean-cut hole is produced.

However, for generating relatively large holes in a composite, it is preferable to use a trepanning tool having multiple teeth or cutting elements, which remove only an annular portion of the composite during the hole-forming operation.

OBJECTS AND SUMMARY OF THE INVENTION

Therefore, it is an object of the invention to provide an optimized method and trepanning tool for generating accurate holes with clean hole edges in composites of at least two materials in which one material has a higher modulus of elasticity than the other material.

It is a further object of the invention to provide an optimized method and trepanning tool for generating holes in composites according to which less heat is generated during the cutting operation than prior known methods and tools, to thus allow higher cutting speeds and the use of cutting edges formed of very hard material, such as various carbides.

It is still another object of the invention to provide an optimized method and tool for quickly and easily generating large diameter holes with clean hole edges in composites of materials with different moduli of elasticity.

Still another object of the invention is to provide an optimized trepanning tool for generating large diameter holes in composites of the type described above which is relatively easy and inexpensive to manufacture.

The method provides for simultaneous point and surface cutting. Point and surface cutting occur at the inner and outer circumferential surfaces of an annular hole being formed, and generally along an outer radial portion of the annular hole between its inner and outer circumferential surfaces. The point cutting proceeds normal to the planar area of the annular hole at its inner and outer circumferential surfaces, while the surface cutting proceeds circumferentially.

The trepanning tool includes a generally cylindrical side wall, portions of which are removed at one end to form a plurality of cutting elements, or teeth, spaced about that end of the cylindrical side wall. Each tooth includes a cutting single end point and associated cutting edges, the geometry of which is essentially the same as that of the single end point and associated cutting edges of the tool described in the above-referenced U.S. patent application Ser. No. 166,868, so as to produce a unique shearing action on the outermost fibers of the portion of the composite to be removed to thereby produce a clean-cut edge. Some of these teeth are disposed so that their single end points define the outer cutting radius of the trepanning tool; the remainder of these teeth are disposed so that their single end points define the inner cutting radius of the trepanning tool. The outwardly-directed teeth are disposed in a common plane orthogonal to the axis of the tool; similarly, the inwardly-directed teeth are disposed in a common plane which is orthogonal to the axis and which is displaced from the common plane of the outwardly-directed teeth so that, during a hole-forming operation, cutting of the composite is initiated by the single end points of the outwardly directed teeth.

In a preferred embodiment of the invention, each tooth includes an insert of metal carbide which defines the single end point and associated cutting edges. When the trepanning tool includes several outwardly-directed teeth, the carbide inserts of these teeth may be disposed so their outer surfaces extend radially outward beyond the outer surface of the cylindrical side wall to form parallel, axially-extending wear strips for guiding the tool during the hole-forming operation. Also, the metal carbide inserts of the inwardly-directed teeth may be disposed so that their inner surfaces extend radially inward towards the tool axis beyond the inner surface of the cylindrical side wall to minimize the transfer of forces from the trepanning tool to the center core or slug generated by the tool during the hole-forming operation.

The above and other objects and features of the invention will become more readily apparent from the following description of preferred embodiments of the invention.

BRIEF DESCRIPTIONS OF THE DRAWINGS

FIG. 1 is a front elevational view of a trepanning tool, according to the invention, viewed with the axis A—A of the tool disposed parallel to the plane of the paper.

FIG. 2 is a top view of the embodiment of FIG. 1.

FIG. 3 is a front view of the cutting end portion of one tooth of the trepanning tool of FIGS. 1 and 2, taken along the line 3—3 of FIG. 2.

FIG. 4 is a side view of the cutting end of one tooth of the trepanning tool shown in FIGS. 1 and 2, taken along the line 4—4 of FIG. 2.

FIG. 5 is a front elevational view of a second, preferred, trepanning tool, according to the invention.

FIG. 6 is a top view of the embodiment of FIG. 5.

FIG. 7 is a front view of the cutting end portion of inwardly-directed tooth of the trepanning tool shown in FIGS. 5 and 6, taken along the line 7—7 of FIG. 6.

FIG. 8 is a side view of the cutting end portion of an inwardly-directed tooth of the trepanning tool shown in FIGS. 5 and 6, taken along the line 8—8 of FIG. 6.

FIG. 9 is a cross-sectional view of a composite work piece having a hole formed therein by the trepanning tool of FIG. 5, showing the composite slug cut from the work piece by the trepanning tool in its initial position.

DESCRIPTION OF PREFERRED EMBODIMENTS

Referring now to FIGS. 1 through 4, a trepanning tool 10 includes a cup-shaped cutter body 12 having a cylindrical side wall 14 which is symmetrically disposed about the tool axis A—A, and a radially extending bottom wall 16 affixed to an axially extending arbor 18. Side wall 14 has concentric cylindrical inner and outer surfaces 20 and 22, respectively. The upper end of the side wall 14 is formed with five, regularly spaced, identical cutting teeth 24 and gullets 26.

Each cutting tooth 24 includes an insert 28 of metal carbide material, such as tungsten carbide or titanium carbide. Each insert 28 has a semi-cylindrical outer surface 30 concentrically disposed radially outward from the side wall outer surface 22, a semi-cylindrical inner curface 32 concentrically disposed radially inward from the side wall inner surface 20, a planar front surface 34 disposed in a common plane with the tool axis A—A and a planar top surface 36. The front surface 34 orthogonally intersects the outer and inner surfaces 32 and 34 to form outer and inner circumference cutting edges 38 and 40, respectively. The front surface 34 also intersects the top surface 36 at an acute angle to form a top end cutting edge 42. The end cutting edge 42 intersects the outer circumference cutting edge 38 at an angle B of approximately 55 degrees to define thereat a single, topmost, cutting end point 44. The top surface 36 intersects the outer surface 30 to form an outer trailing edge 46, and intersects the inner surface 32 to form an inner trailing edge 48. The outer trailing edge 46 intersects the outer circumference cutting edge 38 at the cutting end point 44 at an acute angle C of approximately 65 degrees. Hence, the inner trailing edge 48 intersects the inner circumference cutting edge 40 at the same acute angle C of approximately 65 degrees, and the top surface 36 intersects the front surface 34 at an acute angle of approximately 45 degrees. Since the end cutting edge 42 intersects the outer circumference cutting edge 38 at an acute angle B of approximately 55 degrees, the end cutting edge 42 also intersects the inner circumference cutting edge 40 at an obtuse angle D of approximately 125 degrees.

The cutting end points 44 of the five cutting teeth 24 are disposed in a common plane orthogonal to the tool axis A—A, so that, during a hole forming operation in a composite, penetration of the composite is simultaneously initiated at the five cutting end points 44.

During a hole-forming operation in a composite, the trepanning tool 10 removes an annular portion of the composite to separate a cylindrical slug, or core, from the main body of the composite. The outer diameter of this annular portion of the composite, which is also the diameter of the hole to be formed, is determined by the cutting end points 44 and the outer circumference cutting edges 38 of the cutting teeth 24; the inner diameter of this annular portion, which is also the diameter of the core separated from the main body of the composite, is determined by the inner circumference cutting edge 40 and adjacent portions of the top end cutting edge 42.

The geometry of the cutting end point 44 and associated cutting edges 38 and 42 of each cutting tooth 24 is essentially the same as the geometry of the single cutting end point and associated cutting edges of the tool described in the above-referenced U.S. patent application Ser. No. 166,868; hence, the cutting forces generated at each cutting tooth 24 of the trepanning tool 10 during the hole-forming operation produce a shearing action on the outermost fibers of the annular portion of the composite to be removed, thereby producing a clean-cut edge, in the same manner as the tool described in U.S. patent application Ser. No. 166,868.

The trepanning tool 10 may also include a pilot member 50, which extends axially upward from the open end of the cutter body 12, for guiding the trepanning tool 10 when this tool is used to form a hole concentrically about an existing pilot hole in a composite workpiece.

During the hole forming operation in a composite in which the trepanning tool 10 removes an annular portion of the composite, the outermost fibers of the annular portion are sheared cleanly, as described above, but the cutting action at the inner diameter of the annular portion of the inner circumference cutting edge 40 and the adjacent portion of the top end cutting edge 42 is very poor. This poor cutting edge builds up thrust, causing the transfer of forces from the slug through the final laminates at the time of break-through, thereby producing delamination in the finished part at the exit side of the hole. Thus, the trepanning tool 10 is limited to forming holes through relatively thin composite work pieces, in which thrust caused by the poor cutting action at the inner diameter of the annular portion removed by the trepanning tool 10 is insufficient to cause delamination at the exit side of the hole.

This limitation in the use of the trepanning tool 10 is overcome by modifying this trepanning tool as illustrated by the trepanning tool 52, which is shown in FIGS. 5 through 8 and which is the preferred embodiment of the invention. Since most of the elements of the trepanning tool 52 are identical to corresponding elements in trepanning tool 10, the same numbers have been used in the drawings to identify identical elements of the two trepanning tools 10 and 52.

In the trepanning tool 10, all of the cutting teeth 24 are radially outwardly directed, i.e., the sharp cutting end point 44 of each cutting tooth 24 is disposed at the outer periphery of the cutter body 12. In the preferred embodiment of the invention, two non-adjacent, outwardly-directed cutting teeth 24 have been replaced with two, inwardly-directed cutting teeth 54, each having a single cutting end point 56 disposed on the inner periphery of the cutter body 12. Otherwise, the two trepanning tools 10 and 52 are identical.

Each cutting tooth 54 includes a metal carbide insert 58 having concentric, semi-cylindrical, outer and inner surfaces 60, 62 and planar front and top end surfaces 64, 66. The front surface 64 orthogonally intersects the inner surface 62 to form an inner circumference cutting edge 68, and intersects the top end surface 66 at an acute angle to form a top end cutting edge 70. The top end surface 66 intersects the inner surface 62 to form a top trailing edge 72. The inner circumference cutting edge 68 intersects the top cutting edge 70 at the cutting end point 56 at an acute angle E of approximately 55 degrees, and intersects the top trailing edge 72 at the cutting end point 56 at an acute angle F of approximately 65 degrees; hence, the top end surface 66 intersects the front surface 64 at an acute angle of approximately 45 degrees.

The geometry of the end cutting point 56 and its associated cutting edges 68, 70 of each cutting tooth 54 is essentially the same as the geometry of the single end cutting point and associated cutting edges of the tool described in the above-referenced U.S. patent application Ser. No. 166,868, except the cutting teeth 54 is radially inwardly directed to perform as a turning tool rather than a boring tool Thus, during the hole forming operation, the cutting forces generated at the inwardly-directed cutting teeth 52 produce a shearing action on the innermost fibers of the annular portion of the composite to be removed, thereby producing a clean cut edge at the outer diameter of the slug.

Thus, during a hole-forming operation, in which an annular portion of the composite work piece is removed by the trepanning tool 52, the three outwardly-directed cutting teeth 24 remove an outer part of the annular portion and produce a clean cut edge at the outer cutting diameter of the tool 52, and the two inwardly-directed cutting teeth 54 remove the remaining inner part of the annular portion and produce a clean cut edge at the inner cutting diameter of the tool 52.

In the trepanning tool 10, since each cutting tooth 24 includes both outer and inner circumference cutting edges 38 and 40, the outer surfaces 30 of all five cutting teeth 24 are disposed equidistant from the tool axis A—A to define the outer cutting diameter of the tool 10, and similarly, the inner surfaces 32 of the five cutting teeth 24 are disposed equidistant from the tool axis A—A and define the inner cutting diameter of tool 10. The equivalent inner and outer surfaces of the five cutting teeth 24, 54 of the trepanning tool 52 may be disposed in the same manner. However, since no cutting is performed by the inwardly-directed cutting teeth 54 at the outer cutting diameter of the tool 52, and similarly, no cutting is performed by the three outwardly-directed cutting teeth 24 at the inner cutting diameter of the tool 52, the metal carbide inserts 58 of the two inwardly-directed cutting teeth 54 may be disposed so that their semi-cylindrical outer surfaces 60 are flush with the cutter body outer surface 22 and their inner surfaces 62 which define the inner cutting radius of the tool 52 are disposed inwardly of the inner surfaces 32 of the three outwardly directed cutting teeth 24, which may be ground to be flush with the cutter body inner surface 20, as shown in FIG. 5. By so disposing the metal carbide inserts 58, the surface area of the trepanning tool 52 which is disposed in rubbing contact with the composite work piece is much less than that of the trepanning tool 10.

The cutting end points 44 of the three outwardly-directed cutting teeth 24 are disposed in a first radially-extending plane X—X. Similarly, the cutting end points 56 of the two inwardly-directed cutting teeth 54 are disposed in a second radially-extending plane Y—Y, which is displaced toward the arbor end of the trepanning tool 52 from the first plane X—X by a slight distance G to assure that the slug formed during the hole forming operation is separated from the main body of the composite workpiece at the outer cutting diameter of the trepanning tool 52. Typically, this distance G is in the order of 0.015 to 0.020 inch.

Referring to FIG. 9, to form a hole 74 in a composite work piece 76 using the trepanning tool 52, a pilot hole 78 is first drilled through the composite workpiece 76. The guide element 50 of the trepanning tool 52, which has a diameter only slightly smaller than that of the pilot hole 78, is then inserted in the pilot hole 78 to provide guidance for the trepanning tool 52 during initial stages of the whole cutting operation. The trepanning tool 52 is rotated in a counter-clockwise direction, as seen in FIG. 5, and moved in an axial direction to simultaneously engage the cutting end points 44 of the three outwardly directed cutting teeth 24 with the composite work piece 76 along the circumference of the hole to be formed therein. After the cutting end points 44 have penetrated the first transverse plane of the composite, i.e., transverse to the longitudinal axis of the hole to be generated, the cutting end points 56 of the two inwardly directed cutting teeth 54 are simultaneously engaged with the composite work piece 76 at the circumference of the center core or slug 80 to be formed. Thereafter, the outwardly disposed end cutting points 44 penetrate successive transverse planes of the composite, with the portions of the top and outer cutting edges 36, 38 immediately adjacent the cutting end points 44 cleaning cutting the fibers of the composite work piece 76 at each successively cut transverse plane in the immediate area of the penetration. At the same time, the inner cutting end points 56 penetrate the successive transverse planes of the composite, with the inner and top cutting edges 68, 70 immediately adjacent the inner end cutting points 56 cleaning cutting the fibers of the composite work piece 76 in the immediate region of the penetration. The end cutting edges 42 of the three outwardly directed cutting teeth 24 also cut away chips progressively inward from the annular composite portion to be removed to form the hole 74 and the center core or slug 80 therein, and the top cutting edges 70 of the two inwardly directed cutting teeth 54 cuts away chips progressively outward from the annular composite portion to be removed. After initial penetration of the composite work piece 76 by both the inner and outer cutting end points 44, the semi-cylindrical outer surfaces 30 of the three outwardly directed cutting teeth 24 and the semi-cylindrical inner surfaces 62 of the two inwardly-directed cutting teeth 54, constitute six parallel axial-extending wear strips similar to those of a gun drill, which guide the tool and allow the tool to be used for generating deep holes.

The hole-forming operation is completed when the three outer cutting end points 44 penetrate the last transverse plane of the composite to sever the slug 80 from the composite work piece 76.

Since the cutting end points 44 of the three outwardly-directed cutting teeth 24 cleanly sever the fibers at the hole periphery 82, and the cutting end points 56 of the two inwardly directed cutting teeth 54 cleanly sever the fibers along the cylindrical side 84 of the slug 90, very little deflection of these fibers occurs; thus, the radial compressive forces exerted on the trepanning tool 52 by these fibers and the thrust requirements of the tool 52 are reduced to a minimum, and an accurately sized, clean cut hole is produced.

To demonstrate the superior performance of the trepanning tool 52 over that of the trepanning tool 10, holes were drilled at 1200 rpm in a specimen of approximately 0.150 inch thick, laminated kevlar/epoxy composite by a trepanning tool 10 and by a trepanning tool 52, both tools 10, 52 having an outer cutting diameter of 1 inch, and inner cutting diameter of 13/16 inch, and the geometry and values for angles B, C, E, F given above, by way of example, for these tools 10, 52.

Because of the poor cutting characteristics of the inner circumference cutting edges 40 of the tool 10, much more thrust was required to feed the tool 10 at the same rate as the tool 52.

The tool 52 formed a hole of excellent quality, with virtually no fuzzing or delamination. Similarly, the side of the slug 80 formed by the tool 52 was of excellent quality. However, the side of the slug formed by the tool 10 was fuzzy along its entire length, with delamination occurring at both the tool entrance and exit sides of the slug. The hole generated by the drill 10 was of excellent quality at the tool entrance side of the hole, but with delamination and mushrooming of the aramid fibers occurring at the tool exit side of the hole.

The optimum range values for the end point front angles B, E and for the end point side angles C, F of the trepanning tool 52 will depend on such factors as the type of composite material being drilled, the material of the trepanning tool 52, the inner and outer diameters and the depth of the annular portion of the composite removed by the trepanning tool 52, and the drilling speed. For example, minimum values for these end point angles B, C, E, F are limited by the characteristics of the tool material, whereas maximum values for these angles are limited by the characteristics of the composite. As these angles B, C, E, F are decreased, the cutting end points 44, 56 will be more quickly worn down and more likely to break, and heat can be conducted away from these cutting end points 44, 56 through the cutter body coils; as these angles B, C, E, F are increased, delamination, fraying, and mushrooming are more apt to appear.

To assure a minimum risk of breakage, and acceptable amount of wear, and an acceptable degree of heat transfer, the minimum value of the end point front angles B, E is preferably at least 20 degrees, and the minimum value of the end point side angles C, F is preferably at least 65 degrees. To assure acceptable hole quality, the maximum value of the end point front angles B, E is preferably no more than 65 degrees, and the end point side angles C, F is preferably no more than 75 degrees.

There are many other modifications, variations, and adaptations which can be made to the trepanning tool 52 without adversely affecting its ability to generate holes of high quality in composite work pieces with minimum thrust and torque requirements. For example, the front surface 34 of each outwardly-directed cutting tooth 24 may intersect the outer surface 30 adjacent the cutting end point 44 at an acute angle to form the outer circumference cutting edge 38; similarly, the front surface 64 of each inwardly-directed cutting tooth 54 may intersect the inner surface 62 adjacent the cutting end point 56 at an acute angle to form the inner circumference cutting edge 68.

Neither the front surface 34 nor the top surface 36 of each inwardly-directed cutting tooth 24 are required to be planar surfaces, so long as the front surface 34 intersects the top surface 36 adjacent the cutting end point 44 at an acute angle to form the top end cutting edge 42, the top surface 36 intersects the outer surface 30 adjacent the cutting end point 44 at an angle not exceeding 90 degrees to form the outer circumference cutting edge 38, and the top surface 36 intersects the outer surface 30 adjacent the cutting end point 44 at an acute angle to form the outer circumference cutting edge 38. Similarly, neither the front surface 64 nor the top end surface 66 of each inwardly-directed cutting tooth 54 are required to be planar surfaces, so long as the front surface 64 intersects the top surface 66 adjacent the cutting end point 56 at an acute angle to form the top end cutting edge 70, the front surface 64 intersects the inner surface 66 adjacent the cutting end point 56 at an angle not exceeding 90 degrees to form the inner circumference cutting edge 68, and the top end surface 66 intersects the inner surface 62 adjacent the cutting end point 56 at an acute angle to form the top trailing edge 72.

The number of cutting teeth 24, 54 of the trepanning tool 52 may be varied, depending on the type of composite and size of hole to be driller therein, the tool material, and the drilling speed, so long as it includes at least one outwardly-directed cutting tooth 24, and at least one inwardly-directed cutting tooth 54. Preferably, when an even number of cutting teeth is used, half of these cutting teeth will be outwardly-directed cutting teeth 24, and the remainder will be inwardly-directed cutting teeth 54, with outwardly-directed cutting teeth 24 being disposed between two inwardly-directed cutting teeth 54, and vice versa.

Also, other known types of guiding devices can be used for the initial positioning and guidance of the trepanning tool 52 to replace the pilot member 50 and eliminate the need for drilling a pilot hole 78 for receiving the pilot member 50. For example, it is well known in the art to use an axially extending, retractable, spring-biased, pilot member having one end slidably disposed within the tool arbor 18 and an opposite sharp pointed end which is pressed into the composite to provide initial placement and guidance for the trepanning tool 52. If desired, the surface of the composite may be pricked or punched to receive the sharp end point of this spring-biased pilot member. When the trepanning tool 52 is used with a hand-held power tool, it is desirable that the tool 52 include a pilot element such as the pilot member 50 or the above-described known retractable spring biased pilot member to correctly position the tool 52 and prevent it from skipping across the composite work piece when the hole forming operation is initiated. The trepanning tool 52 does not need to include a pilot element when it is used with hole-drilling apparatus which includes guiding elements for the tool 52. For example, the tool 52 may be guided with conventional hardened guide bushing, which is well known to the art.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A trepanning tool, having an axis, for generating a hole in a composite of at least a first material and a second material having a higher modulus of elasticity than the first material, when the tool, relative to the composite, is rotated about its axis in a first direction of rotation and is moved in a first axial direction against the composite, the tool including a generally cylindrical side wall having a plurality of cutting teeth spaced around one end thereof, the plurality of cutting teeth including:

at least one outwardly directed cutting tooth having a front surface disposed in the first direction of rotation of the tool, a semi-cylindrical outer surface concentrically disposed about the tool axis, and an end surface, the front, outer and end surfaces of the outwardly-directed tooth intersecting at an outer cutting end point, the front surface intersecting the end surface adjacent the outer cutting end point at an acute angle to form an outer end cutting edge, the front surface intersecting the outer surface adjacent the outer cutting end point at an angle not exceeding 90 degrees to form an outer circumference cutting edge, and the end surface intersecting the outer surface adjacent the outer cutting end point at an acute angle to form an outer trailing edge; and at least one inwardly-directed cutting tooth, having a front surface disposed in the first direction of rotation of the tool, a semi-cylindrical inner surface concentrically disposed about the tool axis, and an end surface, wherein the front, inner, and end surfaces of the inwardly-directed tooth intersect at an inner cutting end point, the front surface intersecting the end surface adjacent the inner cutting end point at an acute angle to form an inner end cutting edge, the front surface intersecting the inner surface adjacent the inner cutting end point at an angle not exceeding 90 degrees to form an inner circumference cutting edge, and the end surface intersecting the inner surface adjacent the inner cutting end point at an acute angle to form an inner trailing edge.

2. A trepanning tool, as described in claim 1, wherein the outer end cutting point of the at least one outwardly-directed cutting tooth is axially displaced from the inner end cutting point of the at least one inwardly-directed cutting tooth in the first axial direction.

3. A trepanning tool, as described in claim 1, wherein the tool side wall includes concentric inner and outer cylindrical surfaces, the semi-cylindrical outer surface of the at least one outwardly-directed cutting tooth being displaced radially outward from the outer surface of the tool side wall.

4. A trepanning tool, as described in claim 3, wherein the inner surface of the at least one inwardly-directed cutting tooth is displaced radially inward from the inner surface of the tool side wall.

5. A trepanning tool, as described in claim 1, wherein at least portions of the tool forming the inner and outer end cutting edges and the inner and outer circumference cutting edges comprise a metal carbide material.

6. A trepanning tool, as described in claim 5, wherein the metal carbide material is tungsten carbide.

7. A trepanning tool, as described in claim 5, wherein the metal carbide material is titanium carbide.

8. A trepanning tool, as described in claim 1, wherein:
   the front surfaces of said at least one outwardly-directed cutting tooth and said at least one inwardly-directed cutting tooth are planar surfaces which are disposed in respective common planes with the tool axis; and
   the end surfaces of said at least one outwardly-directed cutting tooth and said at least one inwardly-directed cutting tooth are planar surfaces.

9. A trepanning tool, as described in claim 8, wherein the the acute angles formed by the intersection of the front and end planar surfaces of the at least one outwardly-directed cutting tooth and the at least one inwardly-directed cutting tooth have respective ranges between 65 degrees and 75 degrees.

10. A trepanning tool, as described in claim 8, wherein:
    the outer end cutting edge of the at least one outwardly-directed cutting tooth intersects the outer circumference cutting edge thereof at the outer cutting end point at an acute angle having a range between 20 degrees and 65 degrees; and
    the inner end cutting edge of the at least one inwardly-directed cutting tooth intersects the inner circumference cutting edge thereof at the inner cutting end point at an acute angle having a range between 20 degrees and 65 degrees.

11. A trepanning tool, as described in claim 1, wherein the at least one outwardly-directed cutting tooth comprises a first plurality of outwardly directed cutting teeth and the at least one inwardly-directed cutting tooth comprises a second plurality of inward-directed cutting teeth, said cutting teeth being disposed so that no inwardly-directed cutting tooth is adjacent another inwardly-directed cutting tooth, the inner cutting end points of the inwardly-directed cutting teeth being disposed in a first plane orthogonol to the tool axis, and the outer cutting end points of the outer-directed cutting teeth being disposed in a second plane orthogonol to the tool axis and displaced from the first plane in the first axial direction.

12. A trepanning tool, as described in claim 11, wherein the tool side wall has five cutting teeth equiangularly spaced around the one end thereof, wherein three of the cutting teeth are outwardly-directed cutting teeth and two of the cutting teeth are inwardly-directed cutting teeth.

13. A trepanning tool, as described in claim 1, which further comprises:
   mounting means, disposed at an opposite end of the tool cylindrical side wall, for mounting the tool to a rotary driving means; and
   axially disposed pilot means, having a free end extending in the first axial direction and engaging the composite, for positioning and providing initial guidance to the rotating tool during the hole forming operation.

14. A trepanning method of generating a hole in a composite of at least a first material and a second material having a higher modulus of elasticity than the first material, wherein an annular segment of the composite is removed to form and separate a generally cylindrical composite core from the main body of the composite, the hole being generated having an inner circumferential surface limit and a longitudinal axis, and the core being generated having an outer circumferential surface limit concentrically disposed within the inner circumferential surface limit of the hole, the method comprising the steps of:
   cutting and continuously penetrating the composite at the inner circumferential surface limit of the hole and at an outer point which is simultaneously rotated in one direction about the hole axis and is longitudinally moved in one axial direction;
   simultaneously cutting the composite continuously along a longitudinally extending first line at the inner circumferential surface of the hole being generated and along an outer portion of a first radius of the hole being generated which intersects the first line at the outer point at an acute angle, wherein the first line and the first radius is rotated and moved axially with the outer point to cut away an outer portion of the annular segment of the composite to be removed;
   cutting and continuously penetrating the composite at the outer circumferential surface limit of the core and at an inner point which is rotated about the hole axis in the one direction of rotation and is simultaneously moved in the one axial direction with the outer point; and
   simultaneously cutting the composite continuously along a longitudinally extending second line at the outer circumferential surface of the core and along an outer portion of a second radius of the hole being generated, wherein the inner end of the outer portion of the second radius intersects the second line at an acute angle at the inner point, the second line and second radius being moved with the inner point to cut away the remaining, inner portion of the annular composite segment.

15. A method of generating a hole, as defined in claim 14, wherein the outer point which travels about the inner circumferential surface of the hole is axially displaced in the one axial direction from the inner point which travels about the outer circumferential surface of the core, whereby the core is always separated from the main body of the composite at the outer circumferential surface limit of the hole being generated.

16. A trepanning method of generating a hole in a composite of at least a first material and a second material having a higher modulus of elasticity than the first material, wherein an annular segment of the composite is removed to form and separate a generally cylindrical composite core from the main body of the composite, the hole being generated having an outer circumferential surface limit and a longitudinal axis, and the core being generated having an outer circumferential surface limit concentrically disposed within the inner circumferential surface limit of the hole, the method comprising the steps of:
   cutting and continuously penetrating the composite at the inner circumferential surface limit of the hole to be formed and at a first plurality of outer points which are disposed in a first plane orthogonal to the hole axis and which are simultaneously rotated in one direction about the hole axis and are longitudinally moved in one axial direction;
   simultaneously cutting the composite continuously along a first plurality of longitudinally extending first lines at the inner circumferential surface of the hole being generated and along outer portions of a first plurality of first radii of the hole being generated, the first radii respectively intersecting the first lines at acute angles at respective outer points, wherein the first lines and the first radii are rotated and moved axially with the outer points to cut away an outer portion of the annular segment of the composite to be removed;
   cutting and continuously penetrating the composite at the outer circumferential surface limit of the core to be formed and at a second plurality of inner points which are disposed in a second plane orthogonal to the hole axis and which are rotated about the hole axis in the one direction of rotation and are simultaneously moved in the one axial direction with the plurality of outer points, wherein the first plane is displaced in the one axial direction from the second plane; and
   simultaneously cutting the composite continuously along a second plurality of longitudinally extending second lines at the outer circumferential surface of the core and along outer portions of a second plurality of second radii of the hole being generated, wherein inner ends of the outer portions of the second radii respectively intersect the second lines at acute angles at respective inner points, the second lines and second radii being moved with the inner points to cut away the remaining, inner portion of the annular composite segment;
   whereby the core is always separated from the main body of the composite at the outer circumferential surface limit of the hole being generated.

* * * * *